US007170074B2

(12) United States Patent
Baudat

(10) Patent No.: US 7,170,074 B2
(45) Date of Patent: Jan. 30, 2007

(54) APPARATUS AND METHOD FOR CURRENCY SENSING AND FOR ADJUSTING A CURRENCY SENSING DEVICE

(75) Inventor: Gaston Baudat, Glenmoore, PA (US)

(73) Assignee: MEI, Inc., West Chester, PA (US)

( * ) Notice: Subject to any disclaimer, the term of this patent is extended or adjusted under 35 U.S.C. 154(b) by 125 days.

(21) Appl. No.: 10/363,501

(22) PCT Filed: Sep. 3, 2001

(86) PCT No.: PCT/IB01/02088

§ 371 (c)(1), (2), (4) Date: Jun. 12, 2003

(87) PCT Pub. No.: WO02/21458

PCT Pub. Date: Mar. 14, 2002

(65) Prior Publication Data

US 2004/0021064 A1 Feb. 5, 2004

(30) Foreign Application Priority Data

Sep. 4, 2000 (GB) ................................ 0021680.4

(51) Int. Cl.

*G06K 5/00* (2006.01)
*F21L 4/02* (2006.01)

(52) U.S. Cl. ......................... 250/556; 356/71; 382/135

(58) Field of Classification Search ................ 250/556, 250/557, 226, 458.1, 459.1, 461.2; 356/71; 209/534; 382/7, 135–140

See application file for complete search history.

(56) References Cited

U.S. PATENT DOCUMENTS

| | | | | |
|---|---|---|---|---|
| 5,280,333 | A | 1/1994 | Wunderer | |
| 5,304,813 | A * | 4/1994 | De Man | 250/556 |
| 5,498,879 | A * | 3/1996 | De Man | 250/556 |
| 6,172,745 | B1 * | 1/2001 | Voser et al. | 356/71 |
| 2005/0040773 | A1 * | 2/2005 | Lebens et al. | 315/291 |

FOREIGN PATENT DOCUMENTS

| | | |
|---|---|---|
| WO | WO 97/26626 | 7/1997 |

* cited by examiner

*Primary Examiner*—Stephone B. Allen
(74) *Attorney, Agent, or Firm*—Fish & Richardson P.C.

(57) ABSTRACT

A device for sensing currency comprises means for deriving a signal from a currency item and means for deriving values representative of a characteristic or characteristics of the currency item from said signal using an inverse representation of part of the sensing device.

58 Claims, 11 Drawing Sheets

Fig. 5
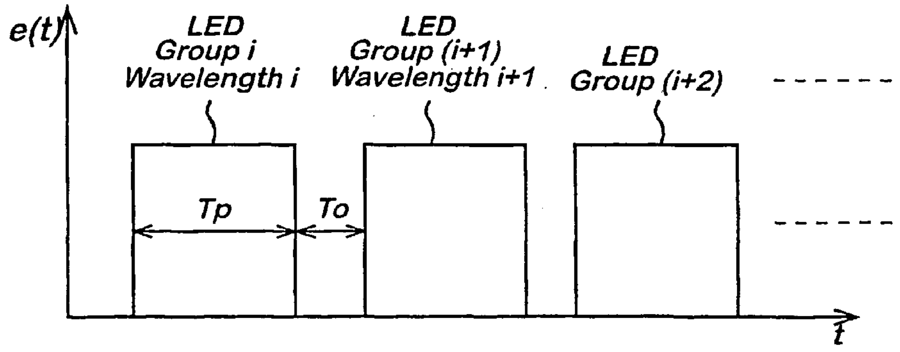
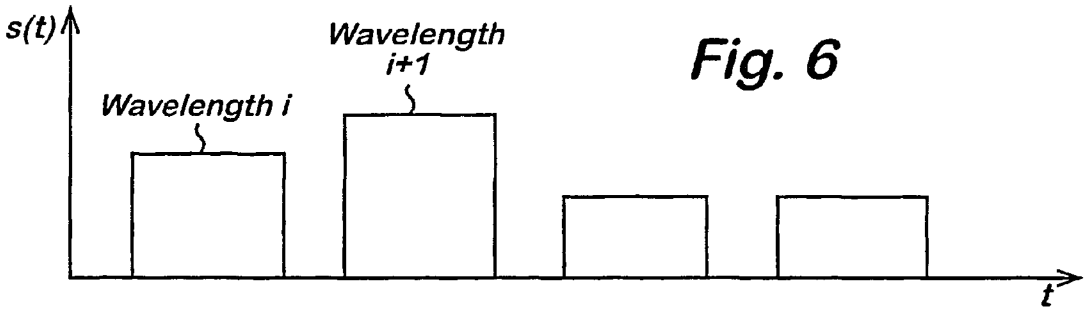
Fig. 6
Fig. 7
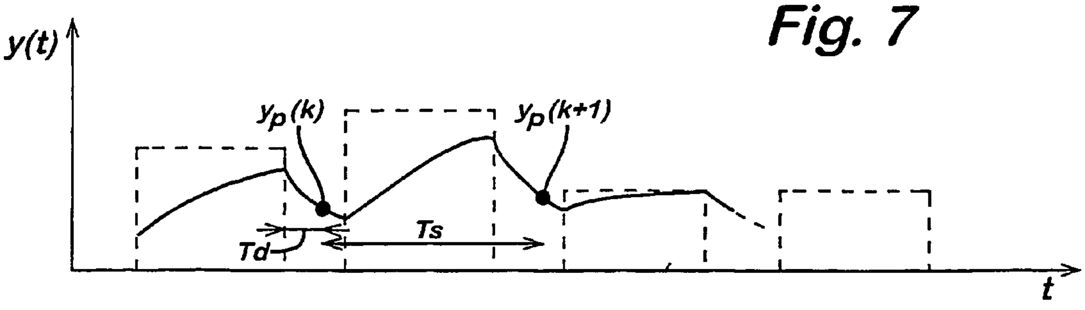

Fig. 10 Principle of pulse width modulation (Td=0)

APPARATUS AND METHOD FOR CURRENCY SENSING AND FOR ADJUSTING A CURRENCY SENSING DEVICE

FIELD OF THE INVENTION

The invention relates to an apparatus and method for sensing documents, and a method for calibrating a document sensor. The invention relates especially to an apparatus for optically sensing and validating documents such as banknotes or other value sheets.

BACKGROUND

An example of a prior art optical sensing device is given in U.S. Pat. No. 5,304,813. The device has a pair of linear arrays of light sources, each array arranged above the transfer path of a banknote, for emitting light towards the banknote, and a detector in the form of a linear array of photodetectors arranged above the transfer path for sensing light reflected by the banknote. The light source arrays have a number of groups of light sources, each group generating light of a different wavelength. The groups of light sources are energised in succession to illuminate a banknote with a sequence of different wavelengths of light. The response of the banknote to the light of the different parts of the spectrum is sensed by the detector array. Because each of the photodetectors in the array receives light from a different area on the banknote, the spectral response of the different sensed parts of the banknote can be determined and compared with stored reference data to validate the banknote.

In known banknote validators of the type such as described in U.S. Pat. No. 5,304,813, it is usual to pulse each light source for a predetermined time that is sufficient to let the detected signal rise to a stable value. The desirability to increase the speed of document processing calls for short pulses on the sources and short response times in the detector. Consequently, the bandwidth requirement in the detector circuit needs to be wide, typically of the order of 160 KHz, to avoid signal distortion. This in turn leads to a degradation of the signal to noise ratio, as noise increases in proportion to the square root of the bandwidth.

Typically, there are variations in the output for different light sources of the same wavelength for the same applied current, because of manufacturing variations. Also, sources of different wavelengths can have intrinsically different power outputs. For example, a green light source is capable of generating only approximately half the detector output of a red or infra-red light source. It is known to compensate for such variations by varying the current supplied to the source using a DAC and a current generator. Similarly, undesirable variations occurring in the detected signal can be accounted for by using a variable gain amplifier in the detector circuit.

A problem with adjusting the current supplied to the LEDs is that the output is not exactly proportional to the current for large changes, and also the LED wavelength changes with the intensity of the current.

It is desirable to provide a currency sensing apparatus which has a high signal to noise ratio and which can be produced at low cost.

SUMMARY

Accordingly, the invention provides a device for sensing currency comprising means for deriving a signal from a currency item and means for deriving values representative of a characteristic or characteristics of the currency item from said signal using an inverse representation of part of the sensing device. Preferably, the invention is used for sensing banknotes or other value sheets. The invention can also be used for sensing other items, such as other types of documents.

In other words, the invention takes a model of the sensor system response, and uses an inverse of that model, and a signal output from the modelled system, to derive values representative of the sensed currency. This can enable, for example, the sensor signal to be read faster, without needing to wait for it to settle to a stable value. Preferably, the inverse representation is a digital filter having a transfer function corresponding to the inverse model.

In an application of the invention, where a banknote is transported at a speed of 360 nm/sec past the sensor, the spectral content of the signal generated in reading the printed pattern on a banknote using a sensor spot size of approximately 5–7 mm is limited to a rather low frequency, usually below 50 Hz.

Therefore it is proposed, in an embodiment of the invention, to use an analog low pass filter as a dominant pole to limit the bandwidth of the detector stage to approximately 300 Hz, which is generally too low to allow the signal to rise and reach a stable condition during the duration of the excitation pulse. The signal is then preferably sampled, converted and processed in the digital domain. A digital signal processing technique (digital signal reconstruction) is then used to reconstruct the input signal as if there was no filter, to determine its input amplitude, which corresponds to the desired information read from the document. In other words, the excitation at the input of the low-pass filter is computed by deconvolving the output signal with the digital model of the filter. This is accomplished by using, for the deconvolution, the inverse function of the digital filter modelling the analog filter and its excitation signal. The resulting bandwidth of this process is approximately 1 kHz. In the above context, this allows a noise reduction of $\sqrt{160}$, assuming a white noise. The advantage of this technique is noise reduction at low hardware cost. In an embodiment, for simplicity and lower cost, a single pole filter is used and rectangular excitation pulses are used. Advantageously, when the measurements are made during the off time of the LEDs, a non-recursive inverse digital filter with only two coefficients can be used. Note that although being more complex and more expensive, multi-pole filters and other excitation forms could be used without departing from the invention.

The values for the pattern on, for example, the document reconstructed in accordance with the invention are in theory independent of the apparatus, particularly the filter and excitation pulse. This means that reference values for validation purposes for each banknote, in the case of a banknote validator, can be derived and used without reference to each individual validator. This makes it easier, for example, to update a validator by adding reference values for a new banknote denomination to be accepted by the validator.

The inverse digital filter, particularly the coefficients, can be derived theoretically or experimentally. An advantage of the experimental approach is that it takes account of the actual performance of the apparatus, compensating for dispersions of component values in manufacture. This also means that the values for the pattern on the documents reconstructed in accordance with the invention are more accurate, which may be especially useful when, for example, standard reference values for a banknote denomination have not been derived with reference to the apparatus in use.

The invention also provides a method of adjusting a currency sensing device comprising at least one excitation source and at least one excitation sensor, the source being controllable by a pulse excitation signal, the method comprising adjusting the width of the pulses such that a signal derived from the excitation sensor approaches a desired value. The invention also provides a processor for reconstructing a representation of a signal input to a filter using a signal output from the filter comprising an inverse representation of the filter, and a corresponding method. The invention also provides a currency sensor wherein measurements of a signal derived from a currency item and generated using at least one pulsed excitation source are taken when the excitation source is off. Other aspects of the invention are set out in the claims.

BRIEF DESCRIPTION OF THE DRAWINGS

An embodiment of the invention, and modifications, will be described with reference to the accompanying drawings of which:

FIG. 5 is a graph illustrating operation of the embodiment;

FIG. 6 is a graph illustrating operation of the embodiment;

FIG. 7 is a graph illustrating operation of the embodiment;

DETAILED DESCRIPTION

Basic components of the banknote validator of this embodiment are essentially as shown and described in WO97/26626, the contents of which are incorporated by reference.

Those basic components will be briefly described below.

Figure 1:
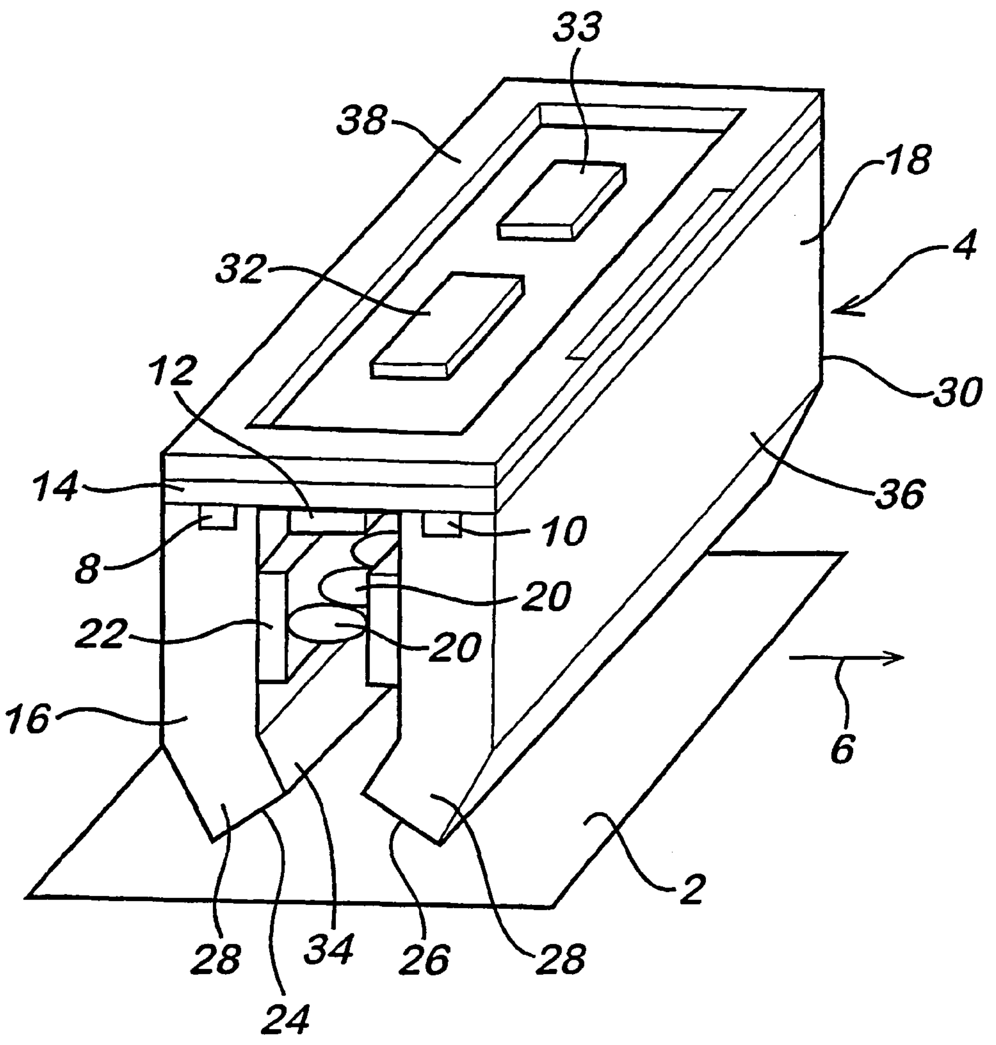
FIG. 1 schematically illustrates an optical sensing device according to an embodiment of the invention.

Referring to FIG. 1, in the validator, a banknote 2 is sensed by an optical sensing module 4 as it passes along a predetermined transport plane in the direction of arrow 6.

The sensing module 4 has two linear arrays of light sources 8, 10 and a linear array of photodetectors 12 directly mounted on the underside of a printed circuit board 14. A control unit 32 and first stage amplifiers 33 for each of the photodetectors are mounted directly on the upper surface of the printed circuit board 14.

Printed circuit board 14 is provided with a frame 38 made of a rigid material such as metal on the upper surface and around the peripheral edges of the board. This provides the printed circuit board, made of a fibre-glass composite, and the source and detector components mounted on its underside, with a high degree of linearity and uniformity across its width and length. The frame 38 is provided with a connector 40 whereby the control unit 32 communicates with other components (not shown) of the banknote validator, such as a position sensor, a banknote sorting mechanism, an external control unit and the like.

The optical sensing module 4 has two unitary light guides 16 and 18 for conveying light produced by source arrays 8 and 10 towards and onto a strip of the banknote 2. The light guides 16 and 18 are made from a moulded plexiglass material.

Each light guide is elongate and rectangular in horizontal cross section and consists of an upper vertical portion and a lower portion which is angled with respect to the upper portion. The angled lower portions of the light guides 16, 18 direct light that has been internally reflected with a light guide 16,18 towards an illuminated strip on the banknote 2 which is centrally located between the light guides 16 and 18.

Lenses 20 are mounted between the light guides in a linear array corresponding to the detector array 12. One lens 20 is provided per detector in the detector array 12. Each lens 20 delivers light collected from a discrete area on the banknote, larger than the effective area of a detector, to the corresponding detector. The lenses 20 are fixed in place by an optical support 22 located between the light guides 16 and 18.

The light-emitting ends 24 and 26 of the light guides 16 and 18, and the lenses 20, are arranged so that only diffusely-reflected light is transmitted to the detector array 12.

The lateral ends 28 and 30, and the inner and outer sides 34 and 36 of the light guides 16 and 18 are polished and metallised.

Although not evident from FIG. 1, each source array 8 and 10, the detector array 12 and the linear lens array 20, all extend across the width of the light guides 16 and 18, from one lateral side 28 to the other, so as to be able to sense the reflective characteristics of the banknote 2 across its entire width.

The light detector array 12 is made up of a linear array of a large number of, for example thirty, individual detectors, in the form of pin diodes, which each sense discrete parts of the banknote 2 located along the strip illuminated by the light guides 16 and 18. Adjacent detectors, supplied with diffusely reflected light by respective adjacent lenses 20, detect adjacent, and discrete areas of the banknote 2.

Figure 2:
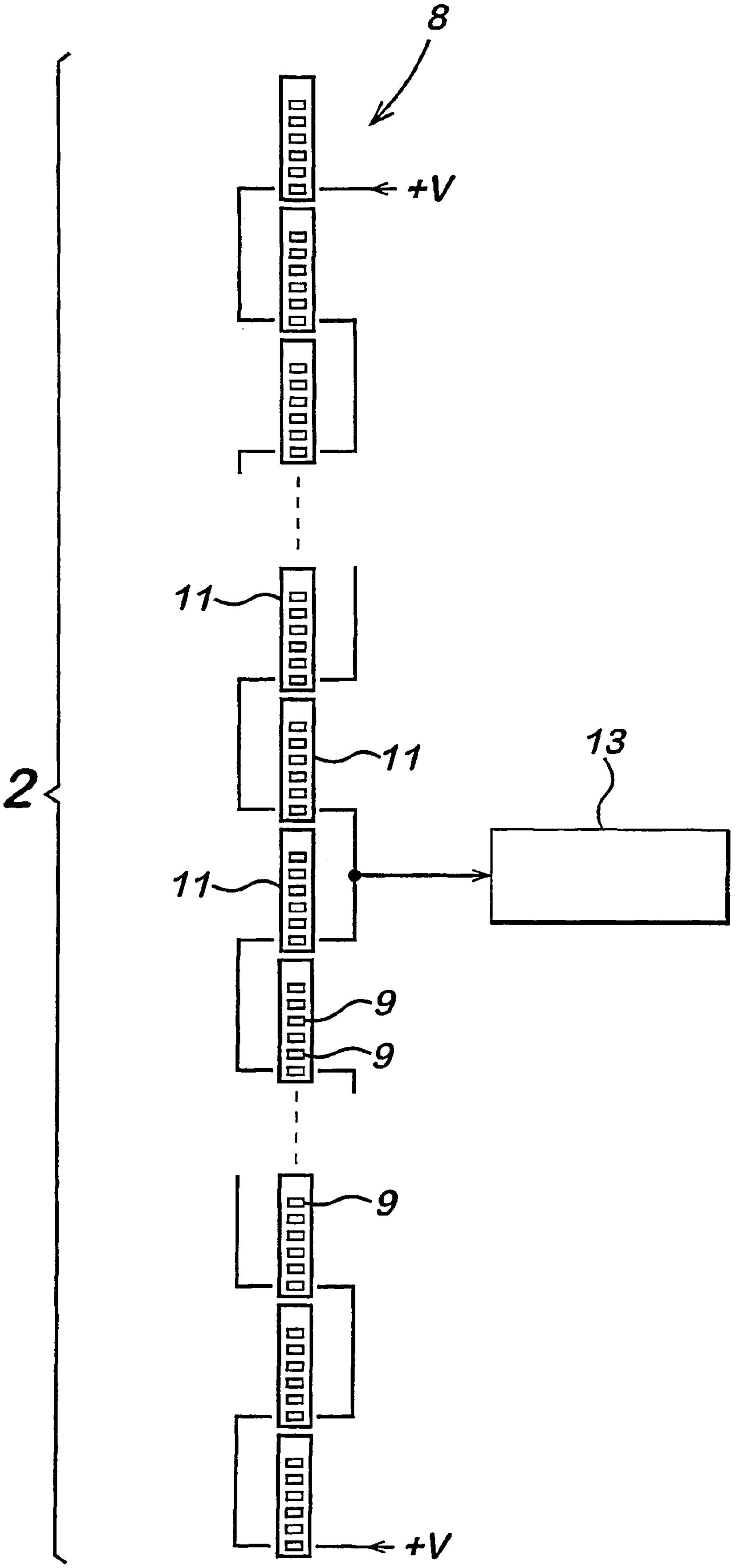
FIG. 2 schematically illustrates the power-delivery arrangement for a light source array used in the arrangement of FIG. 1.

Reference is made to FIG. 2, which illustrates one of the source arrays 8 as mounted on the printed circuit board 14. The arrangement of the other source array 10 is identical.

The source array 8 consists of a large number of discrete sources 9, in the form of unencapsulated LEDs. The source array 8 is made up of a number of different groups of the light sources 9, each group generating light at a different peak wavelength. Such an arrangement is described in Swiss patent number 634411, incorporated herein by reference.

In this embodiment there are six such groups, consisting of four groups of sources generating light at four different infra-red wavelengths, and two groups of sources generating light at two different visible wavelengths (red and green). The wavelengths used are chosen with a view to obtain a great amount of sensitivity to banknote printing inks, hence to provide for a high degree of discrimination between different banknote types, and/or between genuine banknotes and other documents.

The sources of each colour group are dispersed throughout the linear source array 8. The sources 9 are arranged in the sets 11 of six sources, all sets 11 being aligned end-to-end to form a repetitive colour sequence spanning the source array 8.

Each colour group in the source array 8, is made up of two series of ten sources 9 connected in parallel to a current generator 13. Although only one current generator 13 is illustrated, seven such generators are therefore provided for the whole array 8. The colour groups are energised in sequence by a local sequencer in a control unit 32, which is mounted on the upper surface of printed circuit board 13. The sequential illumination of different colour groups of a source array is described in more detail in U.S. Pat. No. 5,304,813 and British patent application No. 1470737, which are incorporated herein by reference.

During banknote sensing all six colour groups are energised and detected in sequence during a detector illumination period for each detector in turn.

Thus, the detectors 12 effectively scan the diffuse reflectance characteristics at each of the six predetermined wavelengths of a series of pixels located across the entire width of the banknote 2 during a series of individual detector illumination periods. As the banknote is transported in the transport direction 6, an entire surface of the banknote 2 is sensed by repetitive scanning of strips of the banknote 2 at each of the six wavelengths. The outputs of the sensors are processed by the control unit 32 as described in more detail below.

A validation algorithm, such as that disclosed in European patent application No. 0560023, is used to evaluate the acquired data representative of the banknote in control unit 32. By monitoring the position of the banknote during sensing with an optical position sensor located at the entrance to the transport mechanism used, predetermined areas of the banknote 2 which have optimum reflectance characteristics for evaluation are identified. The sensed reflectance characteristics of the banknote in those areas are compared with that of stored reference values in order to determine whether the banknote falls within predetermined acceptance criteria, whereupon a validation signal is produced by control unit 32.

Figure 3:
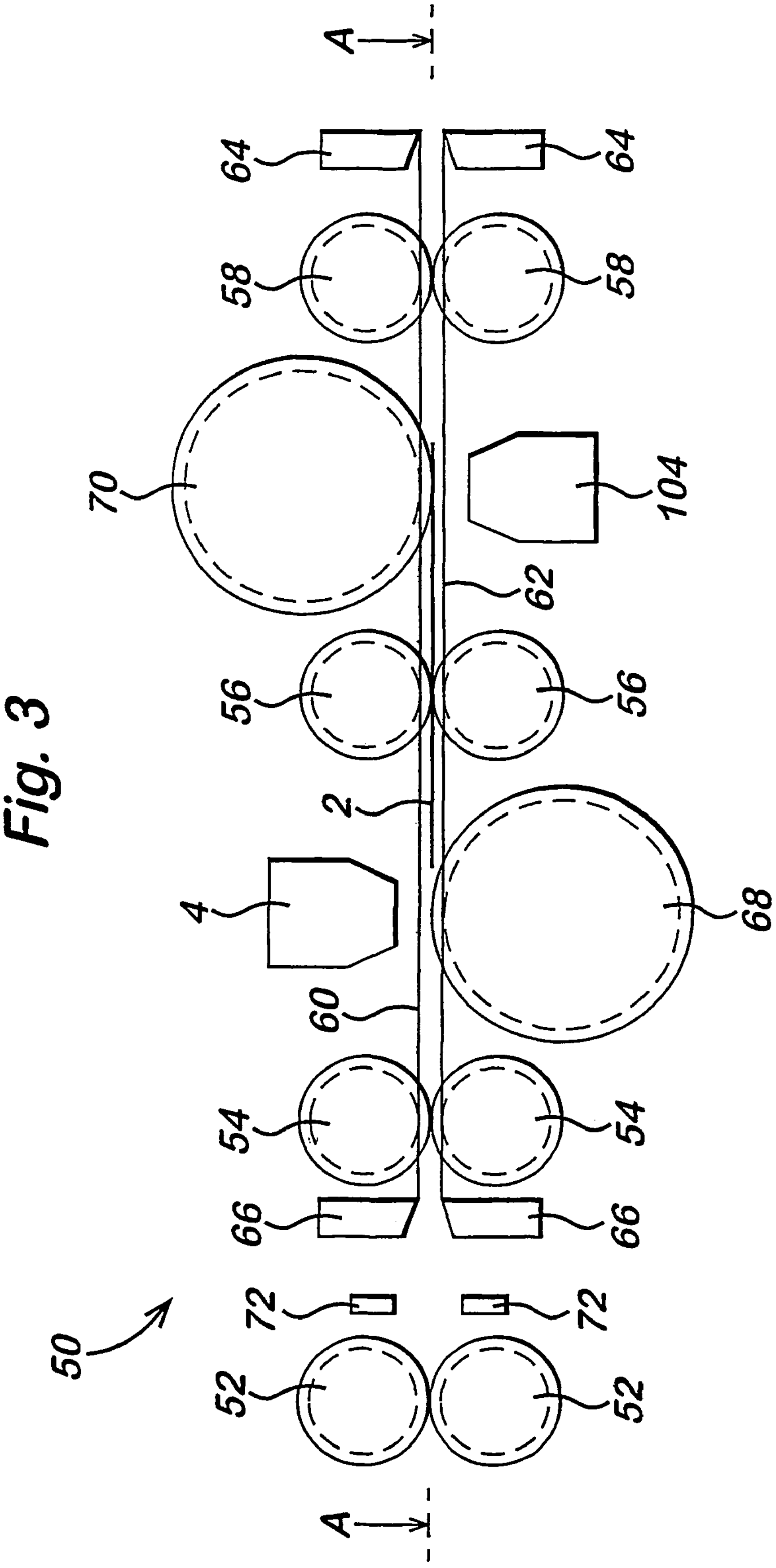
FIG. 3 shows a side view of components of a banknote validator.

Reference is now made to FIG. 3, which illustrates a banknote validator including optical sensing modules as illustrated in FIG. 1. Components already described in relation to FIG. 1 will be referred to by identical reference numerals.

FIG. 3 shows a banknote validator 50 similar to that described in International patent application No. WO 96/10808, incorporated herein by reference. The apparatus has an entrance defined by nip rollers 52, a transport path defined by further nip rollers 54, 56 and 58, upper wire screen 60 and lower wire screen 62, and an exit defined by frame members 64 to which the wire screens are attached at one end. Frame members 66 support the other end of the wire screens 60 and 62.

An upper sensing module 4 is located above the transport path to read the upper surface of the banknote 2, and a lower sensing module 104 is located, horizontally spaced from said upper sensing module 4 by nip rollers 56, below the transport path of the banknote 2 to read the lower surface of the banknote 2. Reference drums 68 and 70 are located opposedly to the sensing modules 4 and 104 respectively so as to provide reflective surfaces whereby the sensing devices 4 and 104 can be calibrated. Each of nip rollers 54, 56 and 58 and reference drums 68 and 70 are provided with regularly-spaced grooves accommodating upper and lower wire screens 60 and 62.

An edge detecting module 72, consisting of an elongate light source (consisting of an array of LEDs and a diffusing means therefor) located below the transport plane of the apparatus 50, a CCD array (with a self-focussing fibre-optic lens array) located above the transport plane and an associated processing unit, is located between entrance nip rollers 52 and the entrance wire supports 66.

Figure 4:
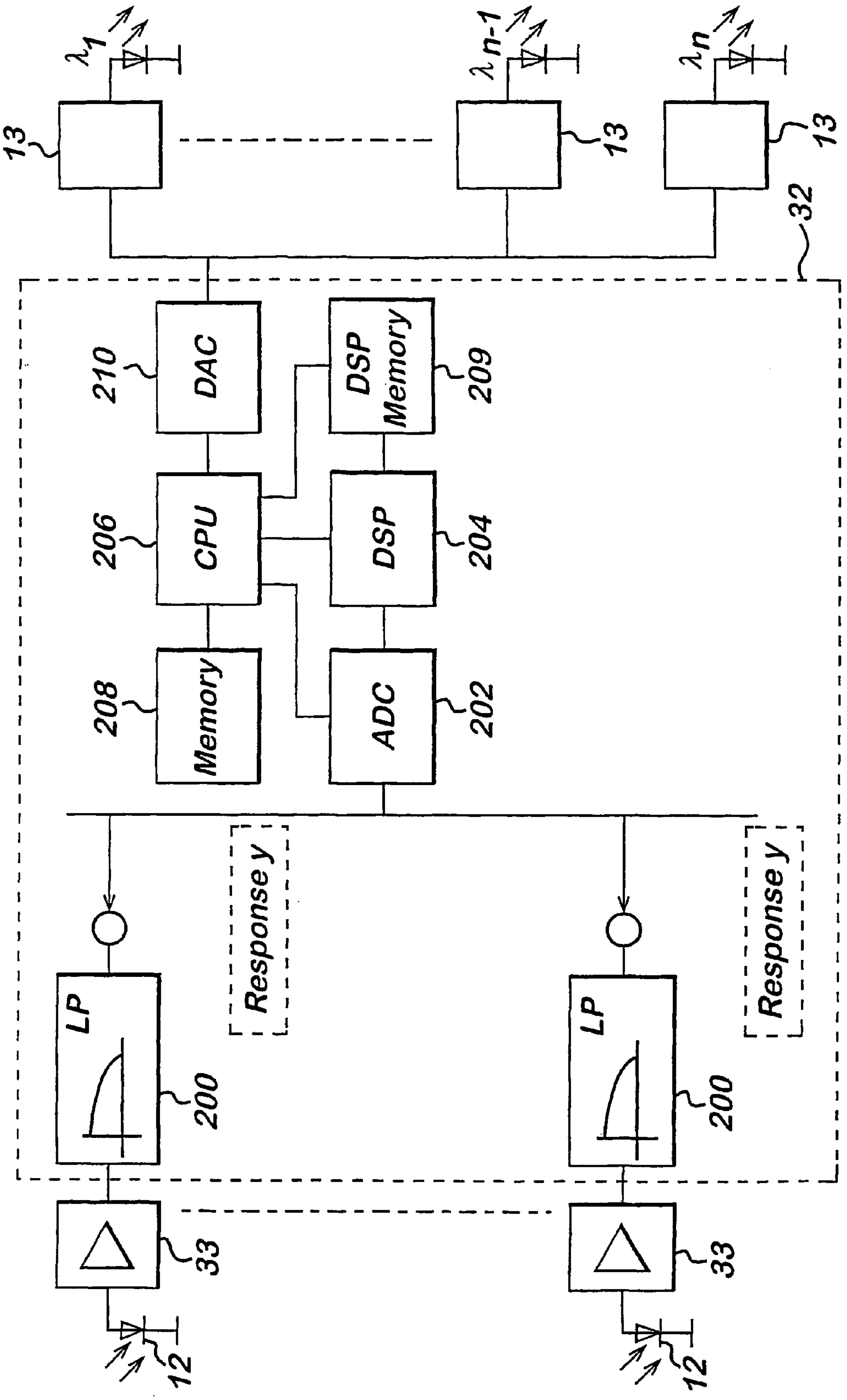
FIG. 4 is a block diagram of components of the optical sensing device.

FIG. 4 is a block diagram illustrating the control unit 32 and connections between the control unit and the light source arrays 8, 10 and the sensor array 12.

With reference to FIG. 4, as mentioned previously, each detector in the detector array 12 is connected to a respective amplifier 33. The output of each amplifier 33 is in turn connected to a respective low pass filter 200. Each low pass filter has a dominant single pole structure with time constant $\tau$ and limits the bandwidth to approximately 300 Hz. In this embodiment, $\tau$ is approximately 500 μs. The output of each low pass filter 200 is connected to an analog-to-digital converter (ADC) 202, and the output of the ADC 202 is connected to a digital signal processor (DSP) 204. The low pass filters 200, the ADC 202 and the DSP 204 are part of the control unit 32. The control unit 32 also includes a central processing unit (CPU) 206, connected to the ADC 202 and the DSP 204, for overall control of the control Unit 32, and a memory 208 connected to the CPU 206. A DSP memory 209, in the form of RAM, is connected to the DSP 204 and the CPU 206. The control unit 32 further includes a digital-to-analog converter (DAC) 210 connected to the CPU 206 for control of the source arrays 8, 10. More specifically, the DAC 210 is connected to each of the current generators 13 which are connected to respective groups of light sources 9. The low pass filters 200 are shown as elements of the control unit 32 but they may be formed separately, as may other elements of the control unit 32.

In operation, a document is transported past sensing module 4 by means of the transport rollers 54. As the document is transported past the sensing module, light of the respective wavelength is emitted from each group of sources 9 in sequence, and light of each wavelength reflected from the banknote is sensed by each of the detectors, corresponding to a discrete area of the banknote.

Each group of sources is driven by a respective current generator 13 which is controlled by the control unit 32 by way of the DAC 210. Each group of sources 9 is driven by current from a current generator corresponding to a predetermined rectangular pulse signal e(t), as shown in FIG. 5. The pulse width and amplitude is the same for each group of sources in this embodiment.

For each wavelength, light from the respective group of sources 9 is mixed in the optical mixer before being output towards the document. In that way, diffuse light is spread more uniformly across the whole width of the document. Light reflected from the document, which has been modified in accordance with the pattern on the document, is sensed by the detector array and the output signals are processed in the control unit 32.

Each group of sources for a respective wavelength is driven in turn by an excitation signal e(t), as shown in FIG. 5. The excitation signal in this embodiment is a rectangular pulse signal, having pulse width Tp. The time from the end of a pulse to the beginning of the next pulse (the "off" period) is To. In this embodiment, the excitation signal is the same for each group of sources. However, in order to calibrate the device, the current supplied (amplitude of pulse signal) may be different for different wavelengths, as described in WO97/26626.

FIG. 6 shows the signal s(t) output from a single sensor in response to a sequence of pulses of light of different wavelengths, after reflection from a document. The signal has a pulse formation, like the excitation signal e(t), with the amplitude modified in accordance with the pattern on the document. The signal s(t) is input to the low pass filter 200.

FIG. 7 shows the output signal y(t) from the low pass filter 200 as a solid line superimposed on the signal s(t) shown as a broken line. The signal y(t) is sampled by the ADC 202 at a sampling interval Ts resulting a sequence of values y(k), y(k+1) etc. Sampling is performed in the "off" period. Td is the time between the end of each pulse and the sampling point. The sampling interval Ts is close to the time constant τ of the analog filter 200. In this embodiment Ts=560 μs.

The DSP 204 uses the values y(k) together with an inverse digital filter, corresponding to the inverse of the analog system (consisting of the excitation pulse e(t) and the low pass filter 200) to estimate values representing the pattern on the bill. These estimated values are given by $\hat{x}(k)$. As these estimated values are based on the values y(k), that is, on a filtered version of s(t), the effect of noise is reduced.

The inverse digital filter is derived theoretically as follows.

The transfer function H(s) for the analog system (pulse generation and low pass filter) can be regarded as:

$$H(s) = e^{(Tp+Td)\cdot s} \cdot \frac{1 - e^{-Tp\cdot s}}{s} \cdot \frac{1}{(\tau \cdot s + 1)}$$

assuming the signal input to the analog filter is now just a Dirac impulse sequence multiplying the signal from the bill x(t), thus $x_s(t)$ (see 1 & 2).

$$x_s(t)=u(t)x(t) \qquad 1)$$

Where:

$$2)\quad u(t) = \sum_{k=-\infty}^{+\infty} \delta(t - k \cdot Ts)$$

The time domain equivalent of H(s) is:

$$3)\quad h(t) = \left(1 - e^{\frac{-Tp}{\tau}}\right) \cdot e^{\frac{-(Td+t)}{\tau}} \cdot \mu(t)$$

Where μ(t) is the Heaviside's step function:

$$\left\{ \begin{array}{c} t < 0 \Rightarrow \mu(t) = 0 \\ t \geq 0 \Rightarrow \mu(t) = 1 \end{array} \right\}$$

The Z transform of h(t) can be derived using the invariant impulse method, which gives:

$$4)\quad H(z) = \frac{\left(1 - e^{\frac{-Tp}{\tau}}\right) \cdot e^{\frac{-Td}{\tau}}}{1 - e^{\frac{-Ts}{\tau}} \cdot z^{-1}}$$

The inverse digital filter D(z) is $H^{-1}(z)$, that is:

$$5)\quad D(z) = \frac{1 - e^{\frac{-Ts}{\tau}} \cdot z^{-1}}{\left(1 - e^{\frac{-Tp}{\tau}}\right) \cdot e^{\frac{-Td}{\tau}}}$$

An estimate of x, $\hat{x}$, is derived using a de-convolution process.

$$D(z) = \frac{\hat{X}(z)}{Y(z)}$$

and consequently $$\hat{x}(k)=b_1 \cdot y(k)+b_2 \cdot y(k-1) \qquad 6)$$

Where the coefficients are:

$$7)\quad b_1 = \frac{1}{\left(1 - e^{\frac{-Tp}{\tau}}\right) \cdot e^{\frac{-Td}{\tau}}} \quad b_2 = -b_1 \cdot e^{\frac{-Ts}{\tau}}$$

Thus, a sequence of estimated amplitude values, $\hat{x}(k)$, representing the pattern on the bill can be obtained from sampled values of the signal output from the filter. The coefficients $b_1$ and $b_2$ are stored in the memory 208 of the control unit. The coefficients are loaded into the DSP memory 209, together with the DSP code, when the apparatus is turned on, or re-booted.

D(z) is a non-recursive filter which means that dealing with any initial conditions needs only two samples. The estimation of the round-off errors and the noise are also easier to handle with non-recursive processing.

The coefficients of the inverse digital filter can be calculated theoretically as described above, using an estimate of the time constant τ of the filter.

Alternatively, the simple LS (least squares) method uses a least mean square estimation of the coefficients by probing the system response with a plurality of excitation signals of known width and amplitude. The model assumes a matrix X of test samples so that X=YB where Y is a matrix of the various test outputs and B is the matrix of researched coefficients. Note that as Y is usually not square, it cannot be inverted. Therefore B can best be estimated using the pseudo inverse matrix method, giving $$B=(Y^T Y)^{-1} Y^T X.$$

Other methods known in the theory of adaptive digital filters (such as Wiener, LMS (least mean square), RLS (recursive least square), can be used to yield similar results and find optimal filter coefficients. These methods are described for example in ISBN 0 201 54413 Digital Signal Processing, Ifeachor & Jervis).

These methods of estimating the coefficients allows the model to be fitted to the values of the actual analog components used in a specific validator unit, allowing for compensation of the dispersion of components values in various units of a production batch. This calibration process takes place either before reading the document, and/or it can be performed at regular time intervals or each time a document is inserted, during initialisation.

In practice, the excitation is generated by controlling the intensity of current in an LED. The amplitude at the input of the filter depends on the optical transfer function of the system at calibration time and can vary during the product life. This problem can be addressed as the test excitation can be directly measured at the input of the filter, or deduced from measurement at the output of the filter. The pulse width can be made large enough to neglect the effect of the time constant of the filter. (For example substantially 8τ for a single pole filter and an error <1LSB of a 12 bits A/D converter.)

The above discussion was limited to the output from one sensor. The embodiment actually includes several sensors, which are read in parallel, and the outputs from each sensor, for each pulse of each wavelength, are handled sequentially by the ADC 202.

In order to reduce further the noise, another digital filter is added to filter the output of the inverse filter.

Figure 8:
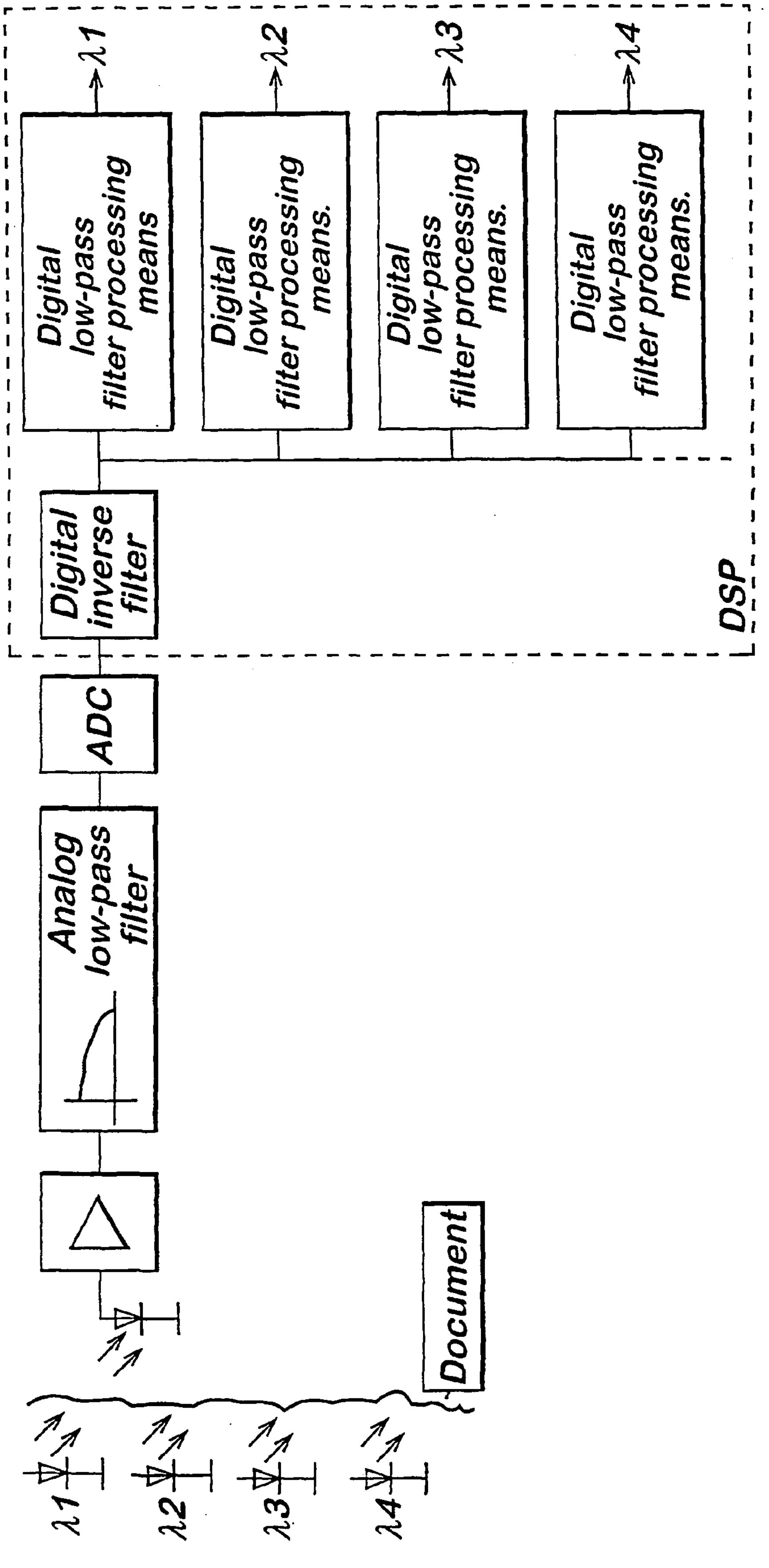
FIG. 8 is a functional block diagram.

This is possible because the maximal frequency content of the signal on a banknote is typically approximately in the range of 50 Hz for each wavelength, for a typical banknote transport speed of about 400 mm/sec with a sensor diameter of approximately 5–10 mm, where as the detector circuit needs a higher bandwidth in order to pass all the 6 wavelengths in sequence. Because of this situation, for each wavelength, a decimation process by 1/6 can be used, sending each individual wavelength data into a corresponding digital low-pass filter of bandwidth substantially 50 Hz. In this embodiment, the further digital filters are $2^{nd}$ order Butterworth filters, although other suitable known filters may be used. This arrangement is shown schematically in FIG. 8. With such an arrangement, the RMS of quantization noise can be reduced, for example, by about a factor of 2, assuming that 50 Hz is sufficient for the banknote signal x(t).

The values $\hat{x}(k)$ representing the pattern on the banknote are used for validating the banknote according to a suitable known method, for example, by comparing values with stored reference windows representative of acceptable banknotes. Preferably, the values are taken from predetermined areas of the banknote.

In a modification of the embodiment described above, the device is calibrated by adjusting the pulse widths of the excitation signal. This may be instead of or as well as calibration by adjusting the current levels.

The calibration process is performed using the reference drums 68, 70 or a reference media such as air or a reference bill, where the expected reference output $x_R$ for each detector is known.

Figure 9:
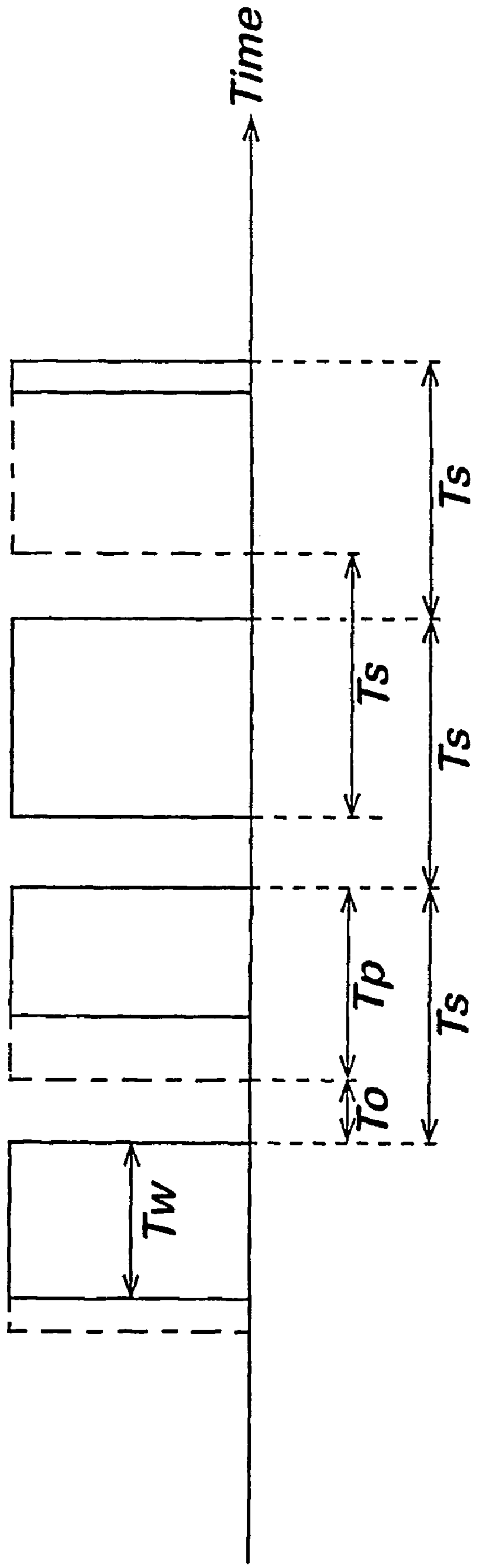
FIG. 9 is a timing diagram for a modification of the embodiment.

FIG. 9 shows an example of an excitation signal e(t) for use with the light sources having successive pulses of different widths. Tp is the maximum pulse width and To is the minimum time off. Tw is an arbitrary pulse width. The following discussion shows in theory how the pulse width Tw can be adjusted to obtain the desired measurement on the detector side.

Equation 6 above shows that the estimate of x is the sum of two terms. One deals with the previous LP filter output signal y(k−1) taken during To (where every source is off), therefore this will not be affected by the next excitation pulse. On the other hand the y(k) term includes the effect of the current pulse.

The equation 8 shows the structure of y(k) assuming we have a linear system and the superposition theorem can be applied.

$$8)\quad y(k) = y_o(k)\cdot e^{\frac{-Td}{\tau}} + \underbrace{y(k-1)\cdot e^{\frac{-Ts}{\tau}}}_{\Delta y(k)}$$

Where:

$$9)\quad y_o(k) = \left(1 - e^{\frac{-Tw}{\tau}}\right)\cdot x(k)$$

$y_o(k)$ corresponds to the whole effect of the current excitation only, assuming the initial condition is null.

Figure 10:
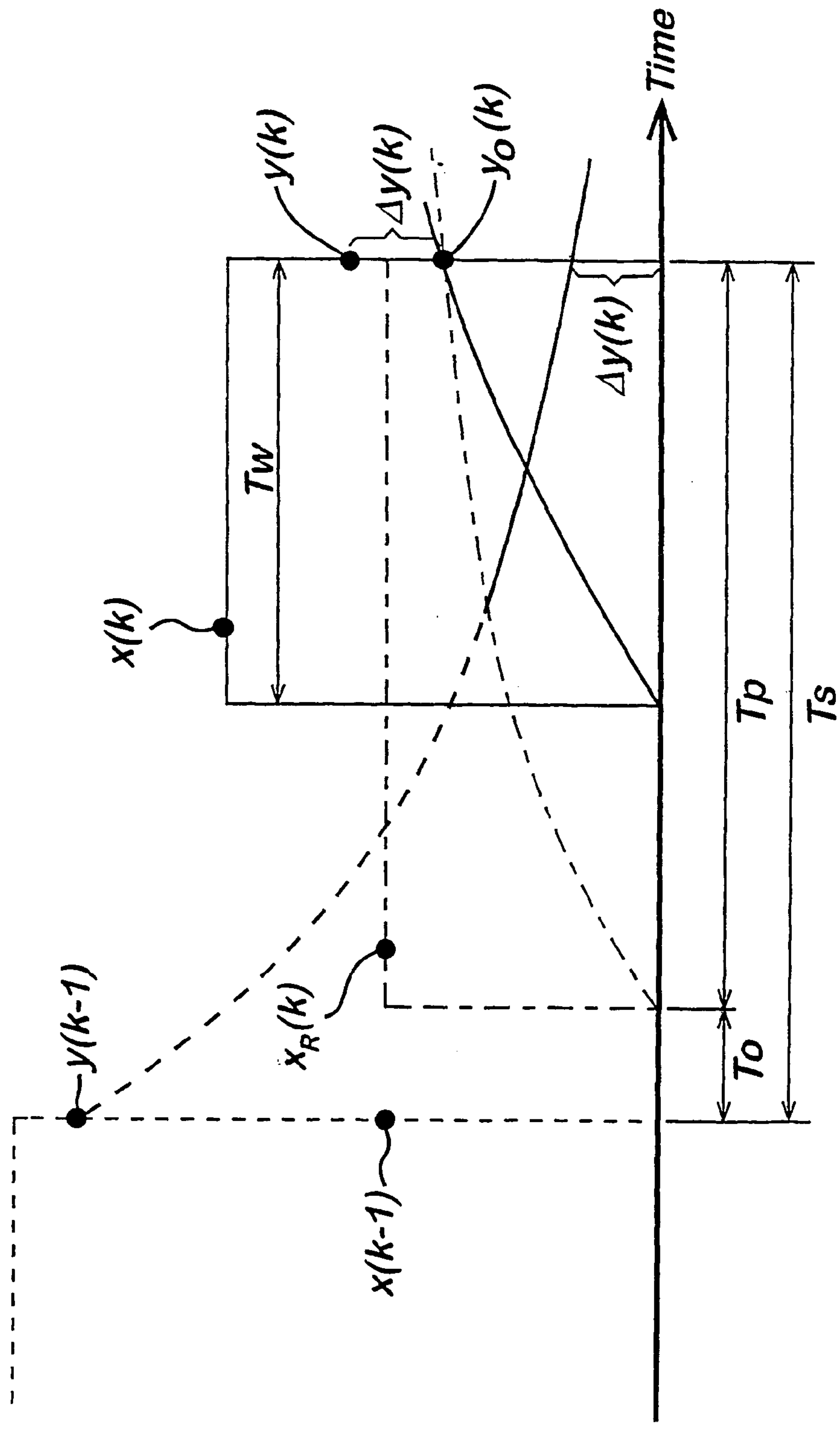
FIG. 10 is a graph for illustrating the modification.

Consider first the actual measured value x(k) for a pulse width Tw which is equal to Tp, compared with the expected reference value $x_R(k)$. If x(k) is not the same as $x_R(k)$, then Tw can be adjusted so that $y_o(k)$ based on x(k) and Tw is the same as for $x_R(k)$ and Tp. If $x(k)>x_R(k)$ then Tw<Tp (a larger x(k) means a larger asymptote for $y_o(t)$). In other words, Tw must be reduced in order to meet the expected $y_o(k)$ value. This is illustrated in FIG. 10.

The above discussion shows that for a measured value that is greater than the desired reference value, calibration can be performed by shortening the associated pulse width.

Preferably, the pulse width is adjusted such that the computed value $\hat{x}(k)=x_R(k)$.

We estimate Tw in order to get at the output of the deconvolution filter: $\hat{x}(k)=x_R(k)$.

Assuming a current actual excitation is x(k), the equation 10 gives its relation with the reconstructed value $\hat{x}(k)$.

$$10)\quad \hat{x}(k) = \left(\frac{1 - e^{\frac{-Tw}{\tau}}}{1 - e^{\frac{-Tp}{\tau}}}\right)\cdot x(k)$$

We want $\hat{x}(k)=x_R(k)$ therefore:

$$11)\quad Tw = -Ln\left(1 - \frac{1 - e^{\frac{-Tp}{\tau}}}{\delta_x(k)}\right)\cdot\tau \quad \text{Where}$$

$$12)\quad \delta_x(k) = \frac{x(k)}{x_R(k)}$$

We can see that:

$$\delta_x(k)=1 \Rightarrow Tw=Tp$$

$$\delta_x(k)\rightarrow+\infty \Rightarrow Tw=0$$

Figure 11:
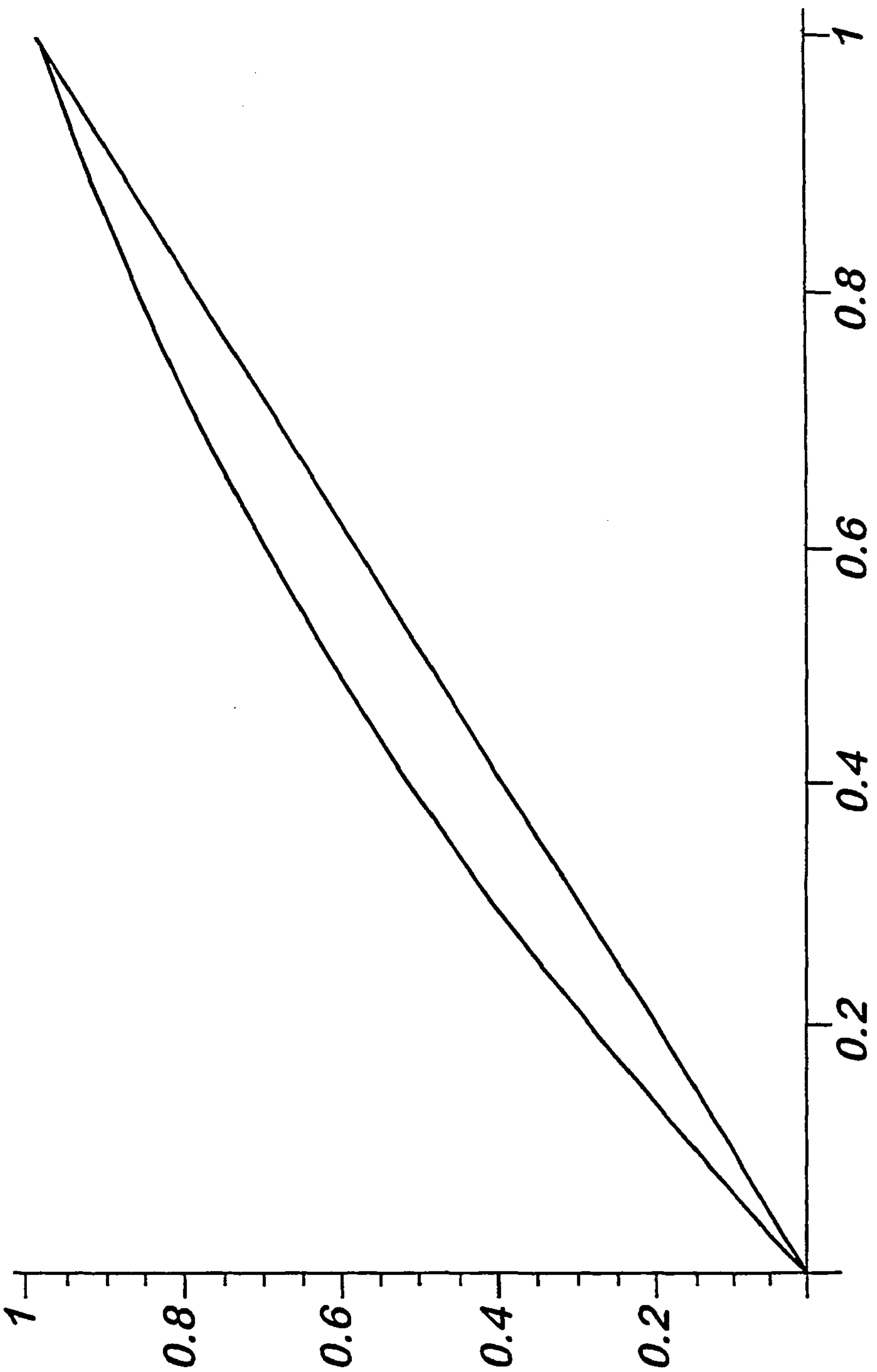
FIG. 11 is a graph for illustrating the modification.

The equation 11 shows that the pulse width is a logarithmic function. Depending on the ratio Tp/τ, a linear approximation can also be used. As example, FIG. 11 shows a plot of the ratio $$\frac{\hat{x}(k)}{x(k)} = \left(\frac{1 - e^{\frac{-kTp}{\tau}}}{1 - e^{\frac{-Tp}{\tau}}}\right)$$

for Tp/τ=1 as function of k compared to a linear curve.

The practical implementation can be done in different ways, one being to use the above equation 12 to compute values for Tw for each light source. Preferably, a table of excitation values with various output levels is built to allow for the imperfections of the actual unit compare to a theoretical model. To build the table, the pulse width is tried by a classical successive approximation to cover the signal dynamic and the DAC value corresponding to the desired output is stored in memory from which it can be retrieved when measuring the document. The table can be built by measurement in the air or through a calibration paper, the transitivity of which is chosen similar to a typical document. When the table is built with air data, a correction factor is used to select the right value to use later when measuring a document. A suitable value of correction factor can be predetermined by the ratio between the signal in the air and the signal in a calibration paper and stored in memory.

Figure 12:
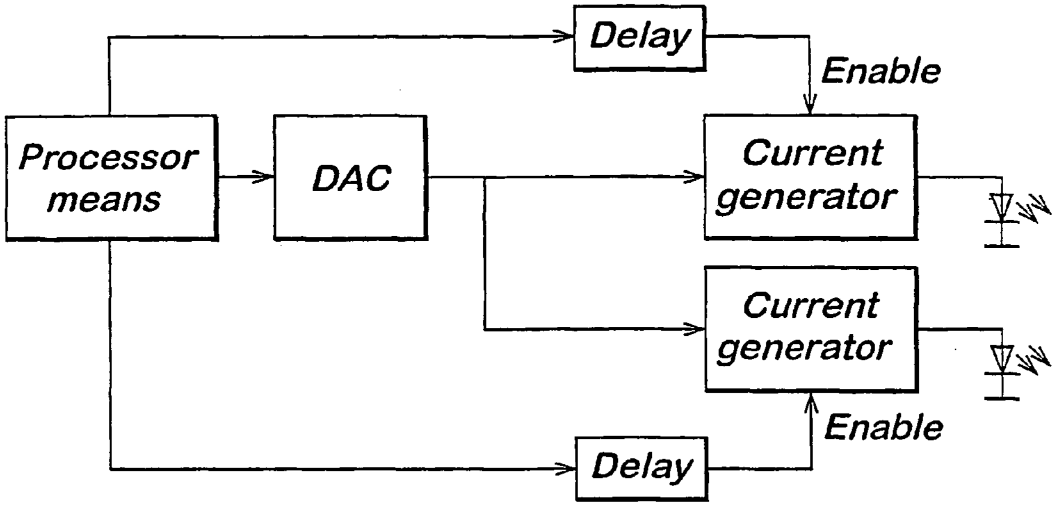
FIG. 12 is a block diagram of current supply control means.
Figure 13:
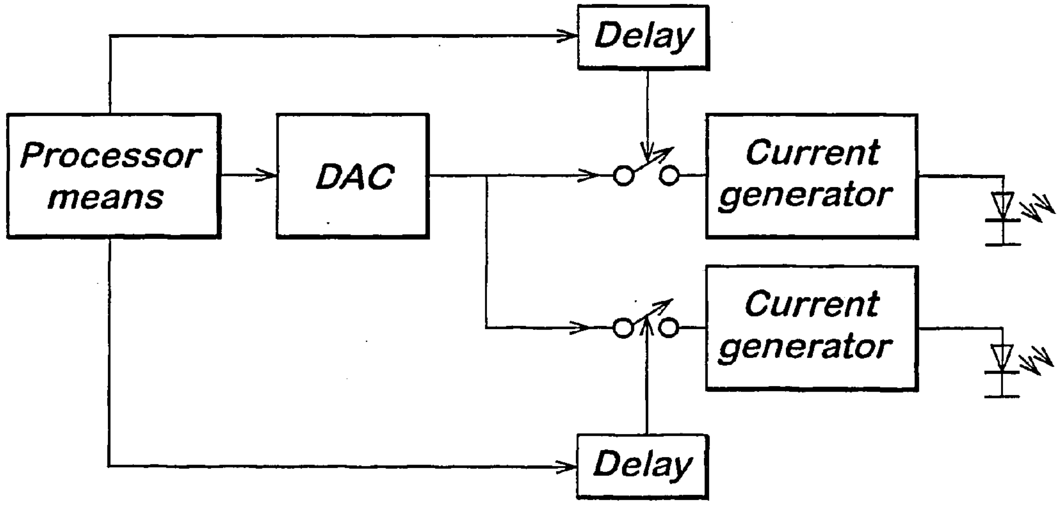
FIG. 13 is a block diagram of second current supply control means.
Figure 14:
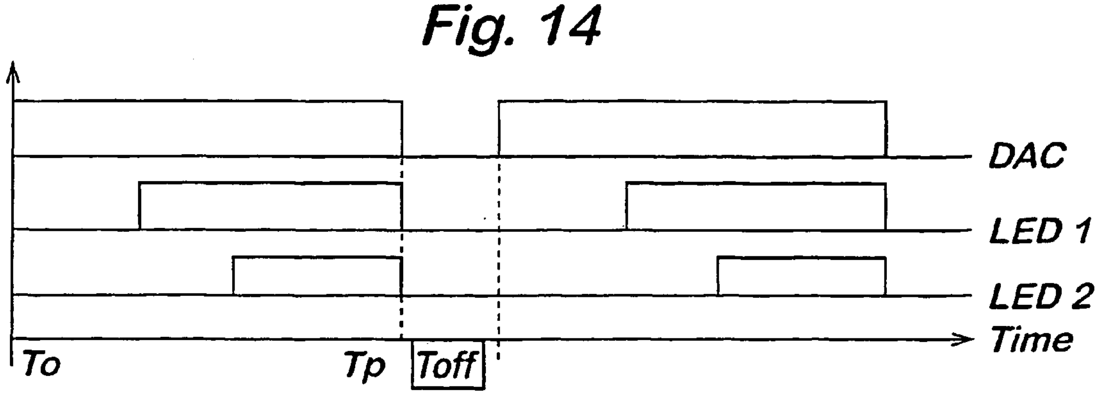
FIG. 14 is a graph illustrating operation of current supply control means.

The above procedure can be used to obtain different pulse widths for LEDs of different wavelengths, or to obtain different pulse widths for different LEDs of the same wavelength. For a group of IEDs emitting light of the same wavelength, brighter LEDs require a shorter pulse width than weaker LEDs. The leading edge of a shorter pulse is delayed so that all the pulses end at the same time, which enables the deconvolution process described above to be used. Two alternative implementations for such an arrangement are shown in FIGS. 12 and 13 with the associated timing diagram in FIG. 14.

In a further modification, pulse width modulation can be used during normal operation of the validator, during document data acquisition, that is other than in the initial calibration, thereby providing a form of "Automatic Range Control".

In that way, the signal can be maximised, improving the signal to noise ratio and avoiding signal conversion in the low range of the ADC.

For a given LED, using the current signal, the next value for the LED brightness, and the corresponding pulse width of the current signal, is determined in order to enhance the signal. In other words, if the current LED output is relatively low, then the intensity of the next LED pulse is increased by a factor F. The factor F will need to be calculated in accordance with the expected maximum variation in the document to avoid clipping of the signal in the subsequent processing. The factor F is subsequently removed in the detected signal digitally by applying a correction factor 1/F to regain the original value of the document.

Figure 15:
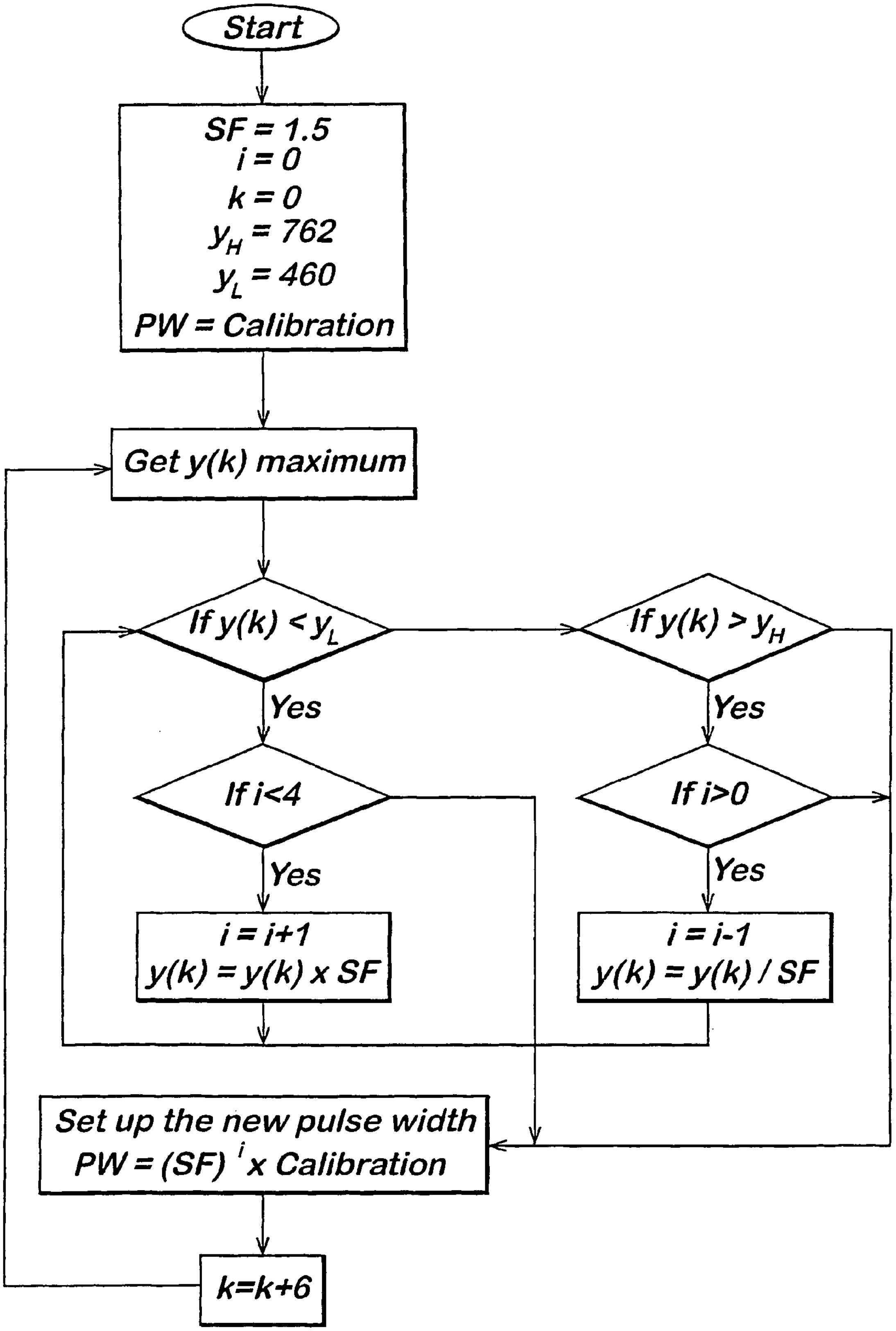
FIG. 15 is a flow diagram.

FIG. 15 is a flow diagram setting out an example of a pulse width modulation method during operation for an LED of a specific wavelength, in a device operating with LEDs of six wavelengths. Here maximum and minimum desired values $y_H$ and $y_L$ and step factor SF are selected in accordance with characteristics and dynamics of the validator (such as detector size, speed of movement of the banknote, ADC scale, dynamic for the bill being processed or for the group of bills accepted by the validator etc). The maximum value y(k) from all of the detectors for a given pulse of a given wavelength is determined. If y(k) is less than $y_L$ or higher than $y_H$, then the current pulse width is increased or decreased by multiplication or division by the step factor SF accordingly to get a suitably higher or lower value for y at the next pulse.

In the above discussion, the excitation signal has a rectangular pulse and a low pass single pole filter is used to filter the signals from the detectors. Other excitation waveforms and more complex filters can be used, with consequential modification of the inverse transfer function, as will be understood by the person skilled in the art.

The embodiment is described as a banknote validator but is applicable to other document sensors, such as other value sheet validators.

Furthermore, as the essence of the invention relates to signal processing, it can be used in association with other types of currency handling machines or validators such as coin validators where a signal representative of a characteristic of a coin is filtered and then reconstructed from the signal output from the filter. Examples of coin handling machines which use signals from sensors influenced by a coin, and which could be adapted in accordance with the invention, are given in EP-A-0 489 041, GB-A-2 093 620 and EP 0 710 933.

In the previous description, the sampling frequency is constant and in that case different sets of filter coefficients may be required for each channel.

However, in another aspect of the invention, another advantage of the 2 coefficients non recursive filter is that it is possible to modulate the sampling frequency and allocate different pulse width maximum time slots for each wavelength. The impact on the performance is a change in the noise level. For example shorter pulses and higher sampling frequency, ie lower sampling period can be used with infra-red LEDs where the signal is strong and the signal to noise ratio sufficient to tolerate a higher noise level. To the contrary, for the blue LED for example, a longer pulse and a longer sampling period can be used, causing a longer integration improving the noise reduction. In that case, the filter coefficient must be adapted to the current sampling period.

The sources and detectors in the embodiment are LEDs and pin diodes but other suitable sources and detectors, such as photo-transistors, may be used.

The embodiment measures light reflected from a banknote, but the invention may be used in association with a document sensor which measures light transmitted through the document.

Instead of a FIR, a recursive filter (Infinite Impulse Response, IIR, filter) could be used. For example, when the excitation signal has no off signal, a recursive filter is used.

Another alternative is to operate in the Fourier domain using fast fourier transforms (FFPT) and inverse FFT to return to the time domain. This has the advantage that it is only necessary to compute the spectrum for the frequencies of interest (in the given example using a banknote, between about 50 Hz and 300 Hz). This approach is particularly useful when the filters have a large number of coefficients, because it requires fewer operations.

In this specification, the term 'light' is not limited to visible light, but covers the whole electromagnetic wave spectrum. The term currency covers, for example, banknotes, bills, coins, value sheets or coupons, cards and the like, genuine or counterfeit, and other items such as tokens, slugs, washers which might be used in a currency handling mechanism.

Although the invention has been described in detail as one embodiment with modifications thereof, aspects of the invention can be embodied independently of each other.

What is claimed is:

1. A device for sensing currency comprising means for deriving a signal from a currency item and means for deriving values representative of a characteristic or characteristics of the currency item from said signal using an inverse representation of part of the sensing device.

2. A device as claimed in claim 1 comprising an analog to digital convertor for sampling a signal derived from the currency item.

3. A device as claimed in claim 1 for sensing documents.

4. A device as claimed in claim 1 for sensing banknotes.

5. A device as claimed in claim 1 wherein the deriving means is a digital signal processor.

6. A device as claimed in claim 5 comprising a memory associated with the digital signal processor for storing the inverse representation.

7. A device as claimed in claim 1 wherein the means for deriving a signal includes signal generating means comprising a component or components equivalent to a sensor for sensing an excitation from an excitation source as modified by the currency item, and a filter.

8. A device as claimed in claim 7 wherein the signal generating means comprises an excitation sensor and an associated filter.

9. A device as claimed in claim 7 wherein the excitation sensor is equivalent to a sensor and a filter.

10. A device as claimed in claim 7 wherein the deriving means uses an inverse representation of said filter.

11. A device as claimed in any one of claims 7 to 10 wherein the filter is a low-pass filter.

12. A device as claimed in any one of claims 7 to 10 wherein the filter is a single pole filter.

13. A device as claimed in any one of claims 7 to 10 wherein the filter is a bandpass filter.

14. A device as claimed in claim 2 wherein the deriving means uses an inverse representation of at least part of the sensing device up to the analog to digital convertor.

15. A device as claimed in claim 14 wherein the deriving means uses a digital filter having a transfer function corresponding to said inverse representation of part of the sensing device.

16. A device as claimed in claim 15 comprising at least one further digital filter for filtering the values derived using the inverse digital inverse filter.

17. A device as claimed in claim 16 wherein the further digital filter is a 2 nd order filter.

18. A device as claimed in claim 16 wherein the further digital filter is a Butterworth filter.

19. A device as claimed in claim 16 wherein the further digital filter limits the signal to a frequency range corresponding approximately to the frequency range of the characteristic or characteristics of the currency item.

20. A device as claimed in claim 19 wherein the further digital filter has a cut-off frequency of approximately 50 Hz.

21. A device as claimed in claim 15 comprising at least one excitation source controlled using an excitation signal.

22. A device as claimed in claim 21 wherein the deriving means uses an inverse representation of the excitation signal.

23. A device as claimed in claim 21 or claim 22 wherein the excitation signal is composed of pulses.

24. A device as claimed in claim 23 wherein the pulses are rectangular pulses.

25. A device as claimed in claim 23 wherein measurements are taken when the pulses are off.

26. A device as claimed in claim 23 wherein at least two excitation sources are driven by respective pulse excitation signals having different pulse widths.

27. A device as claimed in claim 26 wherein the pulses are arranged to end substantially simultaneously.

28. A device as claimed in claim 26 wherein a plurality of excitation sources are driven by common current programming means which sets a current pulse of duration t, the device further comprising means for supplying pulse signals to sources of duration less than or equal to t.

29. A device as claimed in claim 21 wherein the excitation signal is controlled by current programming means comprising a DAC.

30. A device as claimed in claim 21 wherein the or each excitation source is a light source and the or each excitation sensor is a light sensor for sensing light reflected from or transmitted by the currency item.

31. A device as claimed in claim 30 comprising a plurality of light sources.

32. A device as claimed in claim 31 comprising a plurality of light sources for emitting light of the same wavelength.

33. A device as claimed in claim 31 comprising a plurality of light sources for emitting light of different wavelengths.

34. A device as claimed in claim 15 wherein the inverse digital filter is a finite impulse response filter.

35. A device as claimed in claim 34 where the FIR filter is a 2 coefficients filter and where a kth sample value $\hat{x}(k)$ of the signal input to the filter is estimated from the kth output sample y(k) and the preceding output sample y(k−1) of said filter using the equation $\hat{x}(k)=b_1\cdot y(k)+b_2\cdot y(k-1)$ where $b_1$ and $b_2$ are two pre-determined coefficients.

36. A device as claimed in claim 35 where $b_1$ is approximately equal to $$\frac{1}{\left(1-e^{\frac{-Tp}{\tau}}\right)\cdot e^{\frac{-Td}{\tau}}}$$

and $b_2$ is approximately equal to $$-b_1\cdot e^{\frac{-Ts}{\tau}}$$

where τ is the time constant of the filter and Ts is the sampling period and Tp is the pulse width time of the excitation signal.

37. A device as claimed in claim 35 where a sampling period Ts is constant.

38. A device as claimed in claim 35 where a sampling period Ts is variable.

39. The device of claim 38 where the filter coefficients $b_1$ and $b_2$ change according to Ts.

40. A method of manufacturing or adjusting a device for sensing currency, the device including means for deriving a sianal from a currency item, wherein the deriving means includes an analog to digital convertor for sampling a signal derived from the currency item and wherein the deriving means uses a digital filter having a transfer function corresponding to an inverse representation of at least part of the sensing device up to the analog to digital convertor, the device further including means for deriving values representative of a characteristic or characteristics of the currency item from said signal using an inverse representation of part of the sensing device, the method comprising:

estimating coefficients of the digital filter according to a least squares (LS), a least mean square (LMS) or a recursive least square (RLS) method.

41. A method as claimed in claim 40 comprising using a plurality of known test inputs.

42. A method of sensing a currency item using a sensing device comprising:

generating a signal from the currency item; and deriving values representative of characteristics of the currency item using an inverse representation of part of the sensing device.

43. A method of adjusting a currency sensing device comprising at least one excitation source and at least one excitation sensor for sensing currency items, each source being controllable by a pulse excitation signal, the method comprising adjusting the width of the pulses such that a signal derived from the excitation sensor approaches a particular value or set of values.

44. A method as claimed in claim 43 where the pulse width is adjusted within a sampling period by delaying the leading edge of the ON state, the trailing edge being always at the same period after the beginning of the sampling period.

45. A method as claimed in claim 44 wherein each of a plurality of excitation sources is driven by respective pulses ending at the same time within a sampling period.

46. A method as claimed in claim 45 wherein the excitation sources are light sources of approximately the same wavelength.

47. A method as claimed in claim 45 or claim 46 wherein the excitation sources are further driven at respective current levels.

48. A method as claimed in any one of claims 45 and 46 where the pulse width for at least one excitation source is adjusted during the measurement sequence of a currency item.

49. A method as claimed in claim 48 where the pulse width is adapted using a predictive technique using an estimation of the current signal dynamic based on at least 2 past samples.

50. A method as claimed in claim 48 where the pulse width is adapted using a predictive technique using a predetermined maximum dynamic.

51. A method of adjusting the gain of a device for sensing currency, the device including means for deriving a signal from a currency item, means for deriving values representative of a characteristic or characteristics of the currency item from a signal using an inverse representation of part of the sensing device, at least one excitation source that is controlled using an excitation signal composed of pulses, wherein the deriving means includes an analog to digital convertor for sampling a signal derived from the currency item and wherein the deriving means uses a digital filter having a transfer function corresponding to an inverse representation of the excitation signal, the method comprising:

using a pre-defined set of coefficients of the digital filter, which are defined for a nominal predetermined excitation pulse width and using another pulse width for measurement of the currency item.

52. A method of adapting the drive current of a light source in an optical sensing device, the method comprising adapting the drive current based on a predictive technique using a current signal dynamic of a measured currency item.

53. A measurement system of a currency validator comprising:

a plurality of LED sources of different wavelengths, at least one signal detector connected to an analog filter, which is connected to at least one analog to digital converting means, which is connected to processing means for computing a digital filter, the transfer function of which corresponds to an inverse transfer function of the product of the analog filter and an excitation signal to reconstruct an amplitude signal at the input of the analog filter, the processing means being connected to a plurality of digital low-pass filters, each selectively filtering signal samples corresponding to each wavelength.

54. A control unit for a currency sensing device, wherein the device includes means for deriving a signal from a currency item and means for deriving values representative of a characteristic or characteristics of the currency item from the signal using an inverse representation of part of the sensing device, the control unit comprising:

an input to receive a filtered output signal; and means for deriving values representative of a currency item from the filtered output signal using an inverse representation of the filter.

55. An optical sensing device comprising a plurality of light sources and means for independently adjusting the widths of light pulses output by different light sources of approximately the same wavelength.

56. A device as claimed in claim 55 comprising means for independently adjusting the width of the current pulse applied to different light sources.

57. A currency sensor comprising means for generating a signal corresponding to a currency item using at least one pulsed excitation source and means for taking measurements of said signal at points corresponding to when the excitation source is off.

58. A currency validator comprising means for deriving a signal from a currency item, a digital signal processor for processing said signal, and filter means, wherein the digital signal processor is for processing a signal after filtering and for reconstructing values corresponding to the signal without filtering, for use in testing the validity of a currency item.

* * * * *